Dec. 3, 1968   G. RAFFAELLI   3,414,326
SELF-FASTENING SEAT BELT
Filed March 21, 1967

INVENTOR
GIULIO RAFFAELLI
BY Newton, Hopkins, Jones & Ormsby
ATTORNEYS

United States Patent Office 3,414,326
Patented Dec. 3, 1968

3,414,326
SELF-FASTENING SEAT BELT
Giulio Raffaelli, Via del Duomo 12, Lucca, Italy
Filed Mar. 21, 1967, Ser. No. 624,804
Claims priority, application Italy, Mar. 26, 1966,
16,026/66; June 3, 1966, 18,646/66
7 Claims. (Cl. 297—385)

ABSTRACT OF THE DISCLOSURE

A self-fastening seat belt comprising a unitary inflatable tubular belt fixedly connected to a vehicle at one end thereof and attached to a positioning means at the other end thereof. The positioning means is effective to selectively extend and retract the seat belt and to selectively inflate and deflate the seat belt to cause the seat belt to assume a predetermined configuration. The positioning means includes a cylinder positioned beside a seat opposite the fixed end of the seat belt having a piston slidably carried therein. The cylinder is connected to a conventional pressurized fluid source so as to cause the piston to be selectively moved in a first direction within the cylinder. The piston is also connected to an elastic member to selectively cause the piston to move in the opposite direction within the cylinder. The seat belt is connected to the piston so that when fluid under pressure is introduced into the cylinder, fluid will also be introduced into the seat belt to render the same relatively rigid. This moves the piston in the first direction within the cylinder to lengthen the seat belt, while at the same time forcing the seat belt to assume a predetermined configuration. When fluid under pressure is not introduced into the cylinder, the elastic means moves the piston in the direction opposite to the first direction within the cylinder until the piston reaches a predetermined position. A locking means is effective to retain the piston in this position until fluid under pressure is again introduced into the cylinder. When the pressure is again introduced into the cylinder, the locking means releases the piston and the piston is moved in the first direction within the cylinder.

---

This invention relates to a tubular section seat belt, made of air tight material, at one end the belt being attached to a piston slidable within a cylinder and the shape thereof being such as to take a position of approximate adherence to the vehicle roof when compressed air is admitted thereinto, and a position of a usual belt, either as a "shoulder belt" or as a "lap belt," when air is evacuated. At present available belts are formed of two portions, which in use have to be attached to each other by a passenger by means of a buckle; similarly, in order to free himself from the belt a passenger has to release the buckle.

The present invention overcomes this problem through an integral tubular belt, which may be used without opening or closing a buckle, which is fixed at one end and mounted on a cylinder at its other end. As a passenger settles down in a seat, the belt is caused to take the form of an arc through admission of compressed air therein, the convexity of the arc being approximately in the upper front direction related to the seat; in addition to confer the desired shape to the belt, air admission also causes a piston end of cylinder to be moved and hence increase the useful length of the belt, so as to allow a comfortable settling for the passenger. The fixed end of the belt is connected to the vehicle through a safety buckle. When passenger has settled down in the seat, air in the belt and cylinder is evacuated, so as to obtain, upon rearward sliding of the piston returned by a suitable elastic element, the retraction of the movable belt end into the cylinder and a decrease of the useful length thereof. A locking device holds the piston at its retracted position, until compressed air is admitted again into the cylinder. Thus, the belt is operatively positioned and locked at such a position.

Some possible embodiments of the device according to the present invention will now be described, reference being made to the appended drawings, showing the application to a motor vehicle either as a shoulder belt and as a lap belt, being it however understood that a belt according to the present invention may be likewise applied to any means of locomotion and however to any seat requiring a safety of this character, and that belt arrangement and related attachments may be of any other type.

A preferred embodiment of the device according to the present invention will now be described, by way of non-restrictive example, with reference to the appended drawings, in which.

Figure 1:
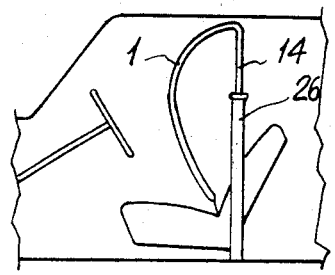
FIGS. 1 and 2 show the application of the belt as a "shoulder" belt.
Figure 2:
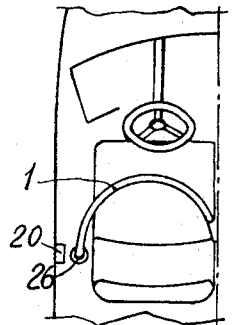

As shown in FIGS. 1 and 2, the belt is essentially formed of the flexible tubular element 1 made of air tight material and collecting device 26 fixed to the vehicle structure, such as center pillar 20 between motor vehicle doors.

Figure 3:
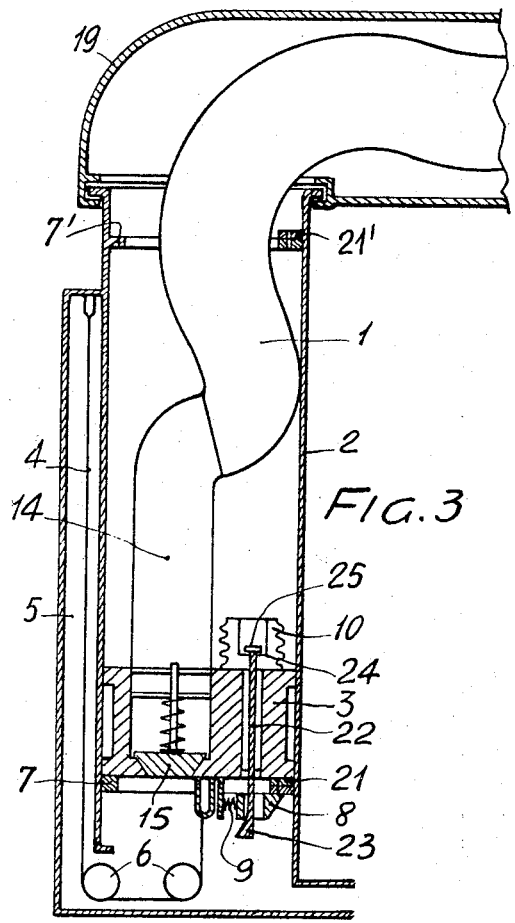
FIG. 3 is a sectional view of the collecting device for the belt.

The collecting device 26 shown in a sectional view in FIGURE 3, is formed of cylinder 2 with its longitudinally bored piston 3; return of piston 3 is caused by the elastic element 4, collecting within container 5, and running on pulleys 6 from which it is prevented from coming out; when an air supply at a subatmospheric pressure is available, the elastic element 4 may be dispensed with, the piston return being in such case achieved by cylinder connection with said air supply, which will also allow, if desired, to provide a better deflation of the belt.

Piston 3 slides between stops 7 and 7' limiting the stroke thereof; when desiring to adjust belt length and elongation, said stops may consist of movable rings, which may be locked on the cylinder walls by cams 21 and 21', respectively, applied thereon. The lower stop ring may be replaced by a self-locking device according to piston acceleration rate during its movement, this device, i.e., being fixed to the elastic return means.

Piston 3 is retained at retracted position by a locking device, which should release said piston when compressed air is admitted into the cylinder; said device is formed of a slide 8 slidable on stop 7 and held at a locking position (FIG. 3) by an elastic element, such as spring 9. In order to be released from the stop, said slide has to be run rearward by a sliding movement of rod 22, at the bottom having the inclined edge 23, upwardly biassed through the action of the end wall of bellows-like reservoir 10; this wall is not integral with rod 22, but operates thereon by means of hooks 24 resting on end head 25 of rod 22: thus, after all, the bellow-like reservoir will operate on slide 8 only when there is an air pressure within the cylinder.

At one end the belt is attached to piston 3 by means of tube 14 which is secured to bored piston 3 at its bore for allowing compressed air passage within the belt; it is preferred that the length of this tube be, in the case of a "shoulder" belt, nearly equal to the spacing between the vehicle roof and the cylinder top, which has to be at the same height of the application for a usual belt connection; in the case of a "lap" belt, it will suffice instead that the length of tube 14 be such as to allow the end of said tube to project from the cylinder. Said tube 14 is preferably end-curved, particularly when a "shoulder" belt is involved, in order to move the belt, when under pressure, to the front portion of the seat, that is in the most favorable direction for passenger's settling. In order to assure that the orientation of said curvature and hence of the piston relative to the cylinder be constant, and also for dimension reduction, a common elliptical section can be adopted both for the cylinder and piston, the latter being obviously provided with suitable sealing members.

When the belt is desired to remain inflated even after being embraced around the passenger, in the connection between the cylinder and belt a valve 15 may be inserted in order to limit the action of the belt on the passenger's body when pressing theregainst, said valve 15 retaining the air admitted into the belt; deflation of the latter in case of non-utilization or disassembly may be effected by applying another valve to be manually controlled and inserted, for example, adjacent the fixed end of the belt. When it is desirable that the remaining pressure within the belt be lower than that of the compressed air source, a further suitably calibrated valve, allowing a partial deflation of the belt, may be added or combined with one of the above described valves.

Figure 4:
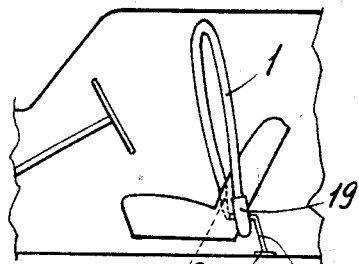
FIGS. 4 and 5 show the application of the belt as a "lap" belt.
Figure 5:
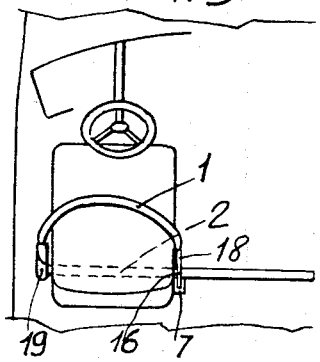

As previously mentioned, the belt may be adapted also to a lap arrangement, an exemplification of which is given in FIGS. 4 and 5. Owing to the greater variation of the tubular element length, also the collecting cylinder 2 is of a larger length in this arrangement, as illustrated in FIG. 5.

Obviously, cylinder 2 is fixed to the vehicle structure by applying it, for example, to the center pillar between the doors and generally to the vehicle body in case of a "shoulder" belt, while it may be applied to the seat in case of a "lap" belt, provided however that it be connected to the vehicle floor through a belt having the required mechanical strength.

At the other end the belt is connected to the vehicle structure preferably by a rigid attachment provided with a buckle and constantly orientated to the seat, so that the belt is already upwardly orientated to facilitate the desired shape to be taken when compressed air is introduced thereinto. When applied to individual seats, or at least separated seat backs, said attachment may be formed of a vertically rocking rod 16 fixed to the vehicle structure by means of a plate 17, which is pivoted thereon for adjusting orientation thereof, and carrying still through a lockable pivot a half-buckle 18, which at the attaching area to the belt is of a cross-section preferably similar to the cross-section assumed by the belt when under pressure. When seats are in the form of continuous twin backs, rod 16 may be applied to the seat structure, such as by a clamp in lieu of plate 17, still connecting it however to the vehicle floor through a belt having the required mechanical strength.

When belt use is not desired, it may be provided that belt itself be collected behind the seat, particularly when seats or at least backs are separated, causing the belt end attached to the piston to be orientated to the rear portion of the seat when in the arcuate shape due to compressed air admission and to retain such orientation during the next step in which the air is caused to flow. For this purpose, and when a "lap" belt is involved, to the cylinder end an element 19 rotating approximately about the cylinder axis may be applied, in which element the belt will slide to be orientated to the direction being desired when compressed air is admitted thereinto, and therefore conformed as a tubular element still allowing the belt to be guided. Instead, when a "shoulder belt" is involved, orientation for the belt end may be achieved by rotating tube 14.

Where the seats, or at least the backs are separated, the half-buckle 18 is rotated to the rear of the vehicle, together with the above described elements 14 or 19. When installing a "lap" belt, the half-buckle 18 and element 19 may be integral by a spindle or by a tube rotating about the cylinder, so as to provide for rotation by using a single member generating it.

The position shown for collecting the belt when not in use is merely an illustrative position, since the belt may also be collected within a socket in the peripherical back edge, as may be preferred for aircraft seats, in such case obviously limiting the rotation of the above described elements. Particularly for a "shoulder" belt, it may also be contemplated that the same be left inflated and adhering to the roof when not in use.

What is claimed is:

1. A seat belt device adapted to be used to secure a passenger to a vehicle seat without the necessity of any hand operation, said device comprising: an inflatable tubular belt, one end of said belt being fixed; a positioning means connected to the other end of said belt and arranged to vary the length of said belt; a pneumatically driven hooking and unhooking device for said positioning means; means for adjusting the stroke of said positioning means and consequently the useful length of said belt in its normal and lengthened positions; and, pneumatic means arranged to admit compressed air into said belt for inflating and lengthening said belt, such belt being normally deflated and soft.

2. A device according to claim 1, further characterized in that said tubular belt, after its inflation and extension, takes an arcuate form with a forward and upward direction in respect to the vehicle, the upper portion of the arc reaching a height which exceeds that of the passenger's head in his seated position.

3. A device according to claim 1, wherein said positioning means comprises a cylinder adapted at its lower end for connection with a source for supplying fluid under pressure to said cylinder; a piston slidable in said cylinder; elastic means constantly urging said piston toward its lower position, said piston defining an axial hole therethrough; and, a rigid tubular element carried by said piston about said axial hole and connected at its upper end with the other end of said flexible tubular belt so as to put said other end of said belt in communication with that portion of said cylinder adapted for connection with said source for supplying fluid under pressure to said cylinder.

4. A device according to claim 3, wherein said positioning means for varying the useful length of said belt includes stop rings selectively placed at the ends of said cylinder so as to selectively vary the stroke of said piston.

5. A device according to claim 4 wherein said hooking and unhooking device comprises a slide member constructed and arranged to slide under one of said stop rings when said piston is in its lower position and lock said piston in its lower position, a spring constantly urging said slide member toward locking position; a shaft for said slide member axially slidable through said piston, said shaft engaging said slide member by means of one inclined end; and, bellows means engaging the other end of said shaft, said bellows means constructed and arranged for connection to the source for supplying fluid under pressure in order to exercise a force on said shaft to force said inclined end of said shaft in contact with said slide member to unlock said piston for movement in said cylinder.

6. A device according to claim 3 wherein said positioning means is fixed to the vehicle seat structure.

7. A device according to claim 3 wherein said positioning means is fixed to the structure of the vehicle.

References Cited

UNITED STATES PATENTS

| | | | |
|---|---|---|---|
| 2,880,789 | 4/1959 | Leibinger | 297—385 |
| 3,142,102 | 7/1964 | Saunders | 297—385 X |
| 3,314,719 | 4/1967 | Johnson | 297—385 |

JAMES T. McCALL, *Primary Examiner.*